United States Patent
Guy

(10) Patent No.: US 10,789,053 B2
(45) Date of Patent: Sep. 29, 2020

(54) FACILITATED USER INTERACTION

(71) Applicant: ALKIRA SOFTWARE HOLDINGS PTY LTD, Fortitude Valley (AU)

(72) Inventor: Raymond James Guy, Doonan (AU)

(73) Assignee: Alkira Software Holdings Pty Ltd., Queensland (AU)

(*) Notice: Subject to any disclaimer, the term of this patent is extended or adjusted under 35 U.S.C. 154(b) by 0 days.

(21) Appl. No.: 16/480,164

(22) PCT Filed: Dec. 22, 2017

(86) PCT No.: PCT/AU2017/051447
§ 371 (c)(1),
(2) Date: Jul. 23, 2019

(87) PCT Pub. No.: WO2018/132863
PCT Pub. Date: Jul. 26, 2018

(65) Prior Publication Data
US 2019/0384582 A1    Dec. 19, 2019

(30) Foreign Application Priority Data

Jan. 23, 2017 (AU) ............................... 2017900198

(51) Int. Cl.
*G06F 3/048* (2013.01)
*G06F 8/38* (2018.01)
(Continued)

(52) U.S. Cl.
CPC .............. *G06F 8/38* (2013.01); *G06F 3/0484* (2013.01); *G06F 9/451* (2018.02); *G06F 16/00* (2019.01)

(58) Field of Classification Search
CPC . G06F 8/38; G06F 9/451; G06F 16/00; G06F 3/0484
See application file for complete search history.

(56) References Cited

U.S. PATENT DOCUMENTS 5,887,139 A * 3/1999 Madison, Jr. ......... G06F 3/1454
                                                        709/223
8,607,251 B1   12/2013 Guillory et al.
(Continued)

FOREIGN PATENT DOCUMENTS

WO     WO 2018/132863        7/2018

OTHER PUBLICATIONS

PCT International Preliminary Report on Patentability in International Appln. No. PCT/AU2017/051447, dated Jul. 23, 2019, 5 pages.

(Continued)

*Primary Examiner* — Phuong H Nguyen
(74) *Attorney, Agent, or Firm* — Fish & Richardson P.C.

(57) ABSTRACT

A method for facilitating user interaction with content including, in a suitably programmed computer system, using a browser application to: obtain content code from a content server in accordance with a content address; and, construct an object model including a number of objects and each object having associated object content, and the object model being useable to allow the content to be displayed by the browser application; using an interface application to: obtain interface code from an interface server; obtain any required object content from the browser application; present a user interface to the user in accordance with the interface code and any required object content; determine at least one user input in response to presentation of the interface; and, generate a browser instruction in accordance with the user input and interface code; and, using the browser application to execute the browser instruction to thereby interact with the content.

20 Claims, 15 Drawing Sheets

(51) Int. Cl.
*G06F 9/451* (2018.01)
*G06F 16/00* (2019.01)
*G06F 3/0484* (2013.01)

(56) References Cited

U.S. PATENT DOCUMENTS

| | | |
|---|---|---|
| 2002/0065658 A1 | 5/2002 | Kanevsky et al. |
| 2007/0011093 A1* | 1/2007 | Tree ........................ G06Q 20/10 705/40 |
| 2007/0055938 A1* | 3/2007 | Herring ............... G06F 16/9577 715/729 |
| 2011/0197124 A1* | 8/2011 | Garaventa ............. G06F 16/972 715/234 |

OTHER PUBLICATIONS

PCT International Search Report and Written Opinion in International Appln. No. PCT/AU2017/051447, dated Mar. 19, 2018, 9 pages.

\* cited by examiner

| | | |
|---|---|---|
| OPEN | Enter start time and date | HELP |
| BACK | ☐ | |
| CLOSE | ☐ | |
| | | |

Fig. 7E

| | | |
|---|---|---|
| OPEN | Journey | HELP |
| BACK | 1) Bus<br>　　26<br>　　Main St<br>　　10am | |
| CLOSE | 2) Train<br>　　147<br>　　Central Station<br>　　2pm | |
| | | |

Fig. 7F

FACILITATED USER INTERACTION

BACKGROUND OF THE INVENTION

The present invention relates to a method and apparatus for facilitating user interaction with content presented by a computer system.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

It is currently very difficult for a visually impaired user to interact with content presented by a computer system, which is often adapted to be presented in a visual manner. For example, webpages are presented on a graphical user interface and therefore require users to be able to see and understand both the content and response options available.

Current solutions to this problem generally involve enhancing the visual presentation of the content, for example by using a screen magnifier, or by using a screen reader application, which simply converts displayed content to an audible form. However, such systems are generally difficult to operate, inconvenient and often work ineffectively on content such as webpages. For example, a magnifier will only work when users are partially sighted and the user must still position a cursor at a relevant screen location in order for the content to be displayed. In the case of screen readers, these read out content on the screen sequentially, meaning it is difficult and time consuming for users to navigate to an appropriate location on a webpage, particular if the webpage includes a significant amount of content. Additionally, screen readers are unable to represent the content of graphics or images unless they have been appropriately tagged, resulting in much of the meaning of webpages being lost.

Attempts have been made to address such issues. For example, the Web Content Accessibility Guidelines (WCAG) have been implemented to try and remove barriers that prevent interaction with, or access to, websites by people with disabilities. These guidelines define tag attributes that should be included in the websites to assist navigation tools, such as screen readers. However, the implementation requires that these tag attributes are intrinsic to website design and must be implemented by web site authors. There is currently limited support for these from web templates and whilst these have been adopted by many governments, who can mandate their use, there has been limited adoption by business. This problem is further exacerbated by the fact that such accessibility is not of concern to most users or developers, and the associated design requirements tend to run contra to typical design aims, which are largely aesthetically focused.

Consequently, with no customized design of websites, systems such as screen readers are technically unable to deliver a usable experience to visually impaired users.

It will also be appreciated that similar issues arise in other circumstances when the ability to view content or provide input is in some way limited. This can arise when a user is attempting to view content in difficult viewing conditions, such as when using an undersized screen, when attempting to interact with content in a hands-free manner, or when using a virtual assistant or non-visual interface.

SUMMARY OF THE PRESENT INVENTION

In one broad form, an aspect of the present invention seeks to provide a method for facilitating user interaction with content presented by a computer system, the method including, in a suitably programmed computer system: using a browser application to: obtain content code from a content server in accordance with a content address, the content code representing content; and, construct an object model indicative of the content from the content code, the object model including a number of objects and each object having associated object content, and the object model being useable to allow the content to be displayed by the browser application; using an interface application to: obtain interface code from an interface server at least partially in accordance with the content address; obtain any required object content from the browser application; present a user interface to the user in accordance with the interface code and any required object content, the interface being at least partially indicative of at least one of: at least some of the object content; and, at least one available user input; determine at least one user input in response to presentation of the interface; and, generate a browser instruction in accordance with the user input and interface code; and, using the browser application to execute the browser instruction to thereby interact with the content.

In one embodiment the interface code defines a plurality of interface pages, and wherein the method includes presenting a number of interface pages in a sequence to thereby allow a task to be performed.

In one embodiment the method includes, in the interface application: presenting an interface page; determining the at least one user input in response to the presented interface page; selecting a next interface page at least partially in accordance with the at least one user input and the sequences of interface pages defined in the interface code; and, presenting the next interface page to the user.

In one embodiment the method includes, in the interface application: determining required object content for an interface page in accordance with the interface code; obtaining the required object content; and, generating the interface page using the required object content.

In one embodiment the method includes: in the interface application: determining required object content using the interface code; generating an object request indicative of the required object content; and providing the object request to the browser application; and, in the browser application: receiving the object request; determining the required object content; generating an object content response indicative of the required object content; and, providing the object content response to the interface application.

In one embodiment the interface code defines a template for at least one interface page, and wherein the method includes, generating the next user interface page by populating the template using the required object content.

In one embodiment the object content includes a number of content items, and wherein the method includes, in the interface application: identifying one or more interface items corresponding to at least one content item using the interface code; and, generating the next interface page using the interface items.

In one embodiment the method includes presenting an audible cue as each next interface page is generated.

In one embodiment the interface pages are arranged hierarchically in accordance with a structure of the content.

In one embodiment at least one interface page is indicative of a respective interaction and one or more interaction response options, and wherein the method includes, in the interface application: determining selection of one of the interaction response options in accordance with user input commands; and, using the selected interaction response option to at least one of: select a next interface page; and, determine the browser instruction to be generated.

In one embodiment the interface code at least one of: defines the browser instructions to be generated; defines a respective browser instruction for each of a number of response options; includes scripts for generating the browser instructions; and, includes scripts defining the browser instructions.

In one embodiment the user interface is presented at least one of: audibly; visually; in a visually simplified form; using a single colour font on a different single colour background; using a light font on a dark background; using a dark font on a light background; using a high contrast colour scheme; and, using an oversized font.

In one embodiment the content address is a Universal Resource Locator and the content code includes HTML code.

In one embodiment the object model includes at least one of: a document object model; and, a style model.

In one embodiment the interaction includes at least one of: selecting an actionable element; modifying the content; submitting a form to the content server; submitting user input to the content server; and, requesting further content from the content server.

In one embodiment the method includes, using the browser application to: generate a content request including the content address; and provide the content request to a content server, the content server being responsive to the content request to provide the content code.

In one embodiment the method includes, using the interface application to: generate an interface code request including the content address; and provide the interface code request to an interface server, the interface server being responsive to the interface code request to provide the interface code.

In one embodiment the interface code includes a mark-up language code.

In one embodiment the method includes generating interface code at least in part through an analysis of interactions with the content.

In one embodiment the method includes: analyzing the content to identify: at least one interaction to be performed; at least some object content to be presented to the user, the object content forming part of an object in an object model, the object model being useable to allow the content to be displayed by the browser application; generating a user interface to be presented to the user, the user interface being indicative of: at least some of the object content to be presented to the user; and, at least one user input providable in response to presentation of the interface; generating a browser instruction for causing a browser application to implement at least one interaction; and, generating interface code indicative of the user interface and the browser instruction.

In one broad form, an aspect of the present invention seeks to provide a system for facilitating user interaction with content presented by a computer system, the system including a suitably programmed computer system that: uses a browser application to: obtain content code from a content server in accordance with a content address, the content code representing content; and, construct an object model indicative of the content from the content code, the object model including a number of objects and each object having associated object content, and the object model being useable to allow the content to be displayed by the browser application; uses an interface application to: obtain interface code from an interface server at least partially in accordance with the content address; obtain any required object content from the browser application; present a user interface to the user in accordance with the interface code and any required object content, the interface being at least partially indicative of at least one of: at least some of the object content; and, at least one available user input; determine at least one user input in response to presentation of the interface; and, generate a browser instruction in accordance with the user input and interface code; and, uses the browser application to execute the browser instruction to thereby interact with the content.

In one broad form, an aspect of the present invention seeks to provide a method for generating interface code usable to facilitate user interaction with content presented by a computer system, the method including, in a suitably programmed computer system: analyzing the content to identify: at least some object content to be presented to the user, the object content forming part of an object in an object model, the object model being useable to allow the content to be displayed by the browser application; and at least one interaction to be performed; generating a user interface to be presented to the user, the user interface being indicative of: at least some of the object content to be presented to the user; and, at least one available user input; generating a browser instruction for causing a browser application to implement the at least one interaction; and, generating interface code indicative of the user interface and the browser instruction, the interface code being executable by an interface application to cause the interface application to: obtain any required object content from a browser application; present the user interface to the user; determine at least one user input in response to presentation of the interface; determine a browser instruction in accordance with the user input; and, provide the browser instruction to the browser application to cause the browser application to execute the browser instruction and thereby interact with the content.

In one embodiment the method includes generating interface code by: analyzing content to identify object content to be presented to the user; identifying an object containing the object content; defining an object request in accordance with the identified object and object content; and, generating interface code in accordance with object request.

In one embodiment the method includes defining the object request by: displaying a list of predefined object requests, each predefined object request having associated predefined code; selecting at least one predefined object request; and, generating the interface code using the associated predefined code.

In one embodiment the method includes generating the interface by: creating a template for at least one of: presenting object content; and, presenting available user inputs; and, generating interface code in accordance with the template.

In one embodiment the method includes defining the one or more interface items by: displaying a list of predefined templates, each predefined template having associated predefined code; selecting at least one predefined template; and, generating the interface code using the associated predefined code.

In one embodiment the object content includes a number of content items, and wherein the method includes: selecting a content item; defining an interface item corresponding to the selected content item; and, generating the interface code in accordance with the interface item.

In one embodiment the method includes defining the one or more interface items by: displaying a list of predefined interface items, each predefined interface item having associated predefined code; selecting at least one predefined interface item; and, generating the interface code using the associated predefined code.

In one embodiment the interface code is generated by: identifying possible interactions with the content; determining instructions for one or more of the possible interactions; and, generating the interface code using the instructions.

In one embodiment the interface code is generated by: displaying a list of predefined interactions, each predefined interaction having associated predefined code; selecting at least one predefined interaction in accordance with possible interactions with the content; and, generating the interface code using the associated predefined code.

In one embodiment the interface code is generated by: determining sequences of interactions representing one or more respective tasks; and, generating the interface code in accordance with the sequences.

In one broad form, an aspect of the present invention seeks to provide a system for generating interface code usable to facilitate user interaction with content presented by a computer system, the system including a suitably programmed computer system that: analyzes the content to identify: at least some object content to be presented to the user, the object content forming part of an object in an object model, the object model being useable to allow the content to be displayed by the browser application; at least one interaction to be performed; generates a user interface to be presented to the user, the user interface being indicative of: at least some of the object content to be presented to the user; and, at least one available user input; generates a browser instruction for causing a browser application to implement the at least one interaction; and, generates interface code indicative of the user interface and the browser instruction, the interface code being executable by an interface application to cause the interface application to: obtain any required object content from a browser application; present the user interface to the user; determine at least one user input in response to presentation of the interface; determine a browser instruction in accordance with the user input; and, provide the browser instruction to the browser application to cause the browser application to execute the browser instruction and thereby interact with the content.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

Various examples and embodiments of the present invention will now be described with reference to the accompanying drawings, in which:

FIGS. 7A to 7F are schematic diagrams of example user interfaces; and,

DETAILED DESCRIPTION OF THE PREFERRED EMBODIMENTS

Figure 1A:
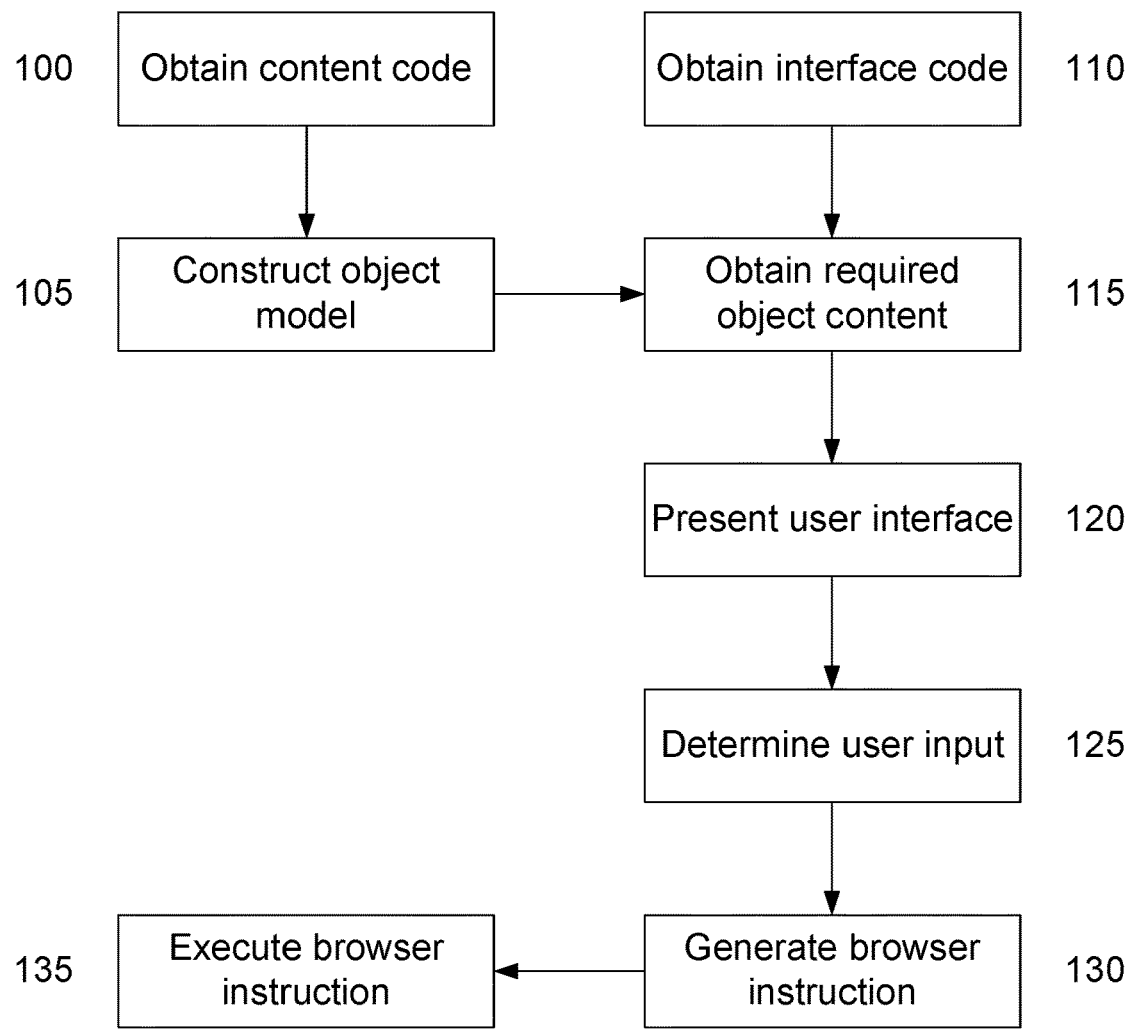
FIG. 1A is a flow chart of an example of a method for facilitating user interaction with content presented by computer systems.

An example of a process for facilitating user interaction with content presented by a computer system will now be described with reference to FIG. 1A.

For the purpose of this example, it is assumed that the process is implemented using a suitably programmed computer system that is capable of retrieving and interacting with content hosted by a remote processing system such as a server. The computer system can be a traditional computer system, such as a personal computer, laptop or the like, but could include any device capable of retrieving and interacting with content, such as a suitably programmed tablet, smart phone, or the like, and the term should therefore be considered to include any such device, system or arrangement.

For the purpose of this example, it is assumed that the computer system executes a browser application and a separate interface application. The browser application mimics at least some of the functionality of a traditional web browser, which generally includes retrieving and allowing user interaction with a webpage, whilst the interface application is used to present a user interface and obtain user input, in this instance. For the purpose of explanation, the browser and interface applications are described as separate entities, with functionality shown on the left and right hand side of the flow charts respectively. However, it will be appreciated that this is not essential, and in practice the browser and interface applications, could be implemented as a single unified application.

In this example, the browser application is used in order to obtain content code from a content server in accordance with a content address at step 100. The nature of the content, the content code and the content address will vary depending on the preferred implementation. In one example, the content is a webpage, with the content code being HTML (HyperText Markup Language) or another similar code and the content address being a URL (Universal Resource Locator) or the like. In this instance, the content server is a web server, but it will be appreciated from the following that other arrangements are feasible.

At step 105 the browser application is utilised to construct an object model indicative of the content, from the content code. The object model typically includes a number of objects, each having associated object content, with the object model being usable to allow the content to be displayed by the browser application. Specifically, in practice, the object model is used by a browser application in order to construct and subsequently render the webpage as part of a graphical user interface (GUI), although this step is not required in the current method. From this, it will be appreciated that the object model could include a DOM (Document Object Model), which is typically created by parsing the received content code.

In a separate process, which can be performed concurrently, or before or after the content has been requested by the browser application, the interface application obtains interface code from an interface server at step 110. This is again typically performed at least partially in accordance with the content address, and may involve forwarding the content address, or part thereof to the interface server. The interface code is utilised in order to allow an interface to be presented to the user to allow the user to interact with the content via the interface application, as will be described in more detail below.

The interface code could be of any appropriate form but generally includes a markup language file including instructions that can be interpreted by the interface application to allow the interface to be presented. The interface code is typically developed based on an understanding of the content embodied by the content code, and the manner in which users interact with the content. The interface code can be created using manual and/or automated processes as will be described in more detail below.

In the current example, the interface server hosts the interface code and is separate from the content server. However, it will be appreciated that this is not essential and alternatively the interface server and content server can be a single logical or physical server, which hosts both the content and interface code.

At step 115 any required object content needed to present the interface is obtained from the browser application. This can be performed in any appropriate manner and could involve having the browser application push object content to the interface application but more typically involves having the interface application seek object content from the browser application. In one example, this is achieved by having the interface application request the content by transferring an instruction to the browser application, causing the browser application to return the relevant content. The required object content is typically specified by the interface code, as will be described in more detail below.

At step 120 the user interface is presented to the user in accordance with the user interface code and any required object content. The user interface is typically indicative of at least some of the object content and/or one or more available user inputs, thereby allowing content to be presented to the user and/or appropriate user inputs to be provided by the user. The user interface is typically presented in a manner which facilitates user interaction, making this suitable for use by a visually impaired user or in other circumstances in which the user has limited ability to interact, for example if the user is interacting with the content using voice commands and/or via virtual assistant software, or they are unable to easily view a display. The manner in which the user interface is presented could include displaying the interface utilising easily readable text, such as plain large font text presented on a plain background, and/or presenting the interface audibly via the use of audible prompts. As will described in more detail below, the user interface is typically simplistically designed and generally includes a single question or piece of information which is then presented together with one or more available response options, to thereby simplify the process of interacting with the content. In particular, this allows the user to interact with the content entirely non-visually, or if the visual interface is used, with only minimal viewing, such as a glance at the interface.

At step 125 the interface application determines at least one user input in response to presentation of the interface. The user input can be provided in any appropriate manner and could involve utilising an input device, such as a touchscreen, mouse or keyboard, or a microphone to provide verbal responses, a camera or other imaging device to provide gesture responses, or the like.

In one example, the user input causes a browser instruction to be generated at step 130, with the browser instruction being based on the user input and the interface code. In this regard, different browser instructions will typically be defined within the interface code for different user inputs, or different required actions, with the instructions optionally being modified based on user input, such as entered text. The browser instruction could be of any appropriate form and could include simple commands, or one or more scripts that can be executed by the browser application, to perform an update of the content either locally or by requesting updated content from the content server.

It will be appreciated that a browser instruction may not be required for all user responses. For example, some responses may simply result in another interface being displayed, as will be described in more detail below.

However, assuming a browser instruction is generated, at step 135 the browser instruction is provided to the browser application to thereby allow the browser application to execute the instruction so that a required interaction with the content can be performed. In this regard, the nature of the interaction will vary depending on the particular circumstances, and can include entering text or other information, selecting content, selecting active elements, such as input buttons, or hyperlinks, or the like. It will also be appreciated that the above described process can be provided repeatedly, allowing a user to perform multiple interactions, thereby allowing respective tasks to be performed, such as completing and submitting forms, performing and reviewing searches or the like.

Accordingly, the above described process allows a user to interact with content such as a webpage by utilising a separate interface application in order to present a user interface to the user. The interface application is utilised in order to present a simplified interface to the user which a visually impaired user can readily understand, or which a visually non-impaired user can use with little or no viewing, for example to allow then to interact with the content via a virtual assistant, such as Siri™, Cortana™, or the like. To achieve this, the simplified interface typically displays a limited amount content corresponding to a subset of the total content and/or potential interactions that can be performed with the content presented by the browser application. This allows this the interface to be vastly simplified, making this easier to navigate and interact with the content in a manner which can be readily understood. This approach also allows multiple interfaces to be presented in a sequence which represents a typical task workflow with the webpage, allowing a user to more rapidly achieve a desired outcome, whilst avoiding the need for the user to be presented with superfluous information.

The interface is presented using separate interface code, additional to the content code, meaning that the original content code can remain unchanged. Furthermore, all interaction with the content server is achieved using the browser application, meaning from the perspective of the content server there is no change in the process of serving content. This means the system can be easily deployed without requiring changes to existing content code or website processes.

Furthermore, the interface also operates to receive user input commands, interpret these and generate control instructions to control the browser application. Thus, it will be appreciated that the interface acts as both an input and output interface for the browser application, so that the user need only interact with the interface application. As the interfaces can be presented in a strictly controlled manner, this provides a familiar environment for users, making it easier for users to navigate and view content, whilst allowing content from a wide range of disparate sources to be presented in a consistent manner.

Thus, it will be appreciated that this provides a greatly enhanced user interaction experience, effectively enabling visually impaired users to access content designed for ably sighted users, whilst further addressing the technical issue of ensuring this can be achieved effectively without disrupting existing browsing processes.

It will also be appreciated this process could provide necessary verbal prompts and set up a range of expected verbal responses for a virtual personal assistant, allowing any user to effectively interact with a website hands-free, again without disrupting the existing browsing process.

A number of further features will now be described.

In one example, as previously mentioned, the user interface typically includes a plurality of interface pages wherein the method includes presenting a number of interface pages in a sequence in order to allow tasks to be performed. Thus, interface pages can be utilised in order to ascertain what task the user wishes to perform and then break down that task into a sequence of more easily performed interactions, thereby simplifying the process of completing the task.

The process of presenting the sequence of interface pages is typically achieved by presenting an interface page, determining at least one user input in response to the presented interface page, selecting a next interface page at least partially in accordance with the user input and then presenting the next page, allowing this process to be repeated as needed until desired interactions have been performed. The sequence of interface pages is typically defined in the interface code, for example by specifying which interface page should be presented based on the previous displayed page and a selected response. In this manner, a workflow to implement tasks can be embodied within the interface code, meaning it is not necessary for the user to have any prior knowledge of the website structure in order to perform tasks.

Whilst the interface pages can be defined wholly within the interface code, typically at least some of the interface pages will display a portion of the content, such as a particular part of the website. In order to ensure that the correct content is retrieved and displayed, the required content is specified within the interface code. As content can be dynamic or change over time, the content is typically defined in a manner which allows this to be reliably retrieved, in particular by specifying the object from which content should be obtained. Accordingly, when an interface page is to be displayed, the method typically includes having the interface application determine required object content for the next interface page in accordance with the interface code, obtain the required object content and then generate the next user interface page using the required object content.

In one particular example, the process of retrieving content typically involves having the interface application determine required object content using the interface code, generate an object request indicative of the required object content and provide the object request to the browser application. In this instance, the browser application receives the object request, determines the required object content, typically from the constructed object model, generating an object content response indicative of the required object content and then providing the object content response to the interface application.

It will be appreciated that as part of this process, if expected content isn't available, then alternative object content could be displayed, as defined in the interface code. For example, if a request resource isn't available, an alternative resource and/or an error message could be displayed, allowing exception handling to be performed.

In order to allow the interface pages to be generated in a simple manner, whilst incorporating object content, the interface code typically defines a template for at least one interface page, with the method including generating the next user interface page by populating the template using the required object content. This allows the required object content to be presented in a particular manner thereby simplifying the meaning. This could include for example breaking the object content down into separate items which are then presented audibly in a particular sequence or laid out in a particular manner on a simplified visual interface.

In one particular example, the object content can include a number of content items, such as icons or the like, which may be difficult for a visually impaired user to understand. In order to address this, the interface application can be adapted to identify one or more interface items corresponding to at least one content item using the interface code and then generate the next interface page using the interface item. Thus, content items that are difficult for the visually impaired user to understand can be substituted for more understandable content, referred to as interface items. For example, an icon showing a picture of a train could be replaced by the word train which can then be presented in audible or visual form.

In one example, as content pages may take time to generate, for example if additional content has been requested from a content server, an audible cue can be presented while the interface page is created, thereby alerting the user to the fact that this is occurring. This ensures the user knows the interface application is working correctly and allows the user to know when to expect the next interface page to be presented.

The interface pages can be arranged hierarchically in accordance with a structure of the content. For example, this allows interface pages to be arranged so that each interface page is indicative of a particular part of a task, such as a respective interaction and one or more associated user input options, with the pages being presented in a sequence in accordance with a sequence of typical user interactions required to perform a task. This can include presenting one or more initial pages to allow the user to select which of a number of tasks should be performed, then presenting separate pages to complete the task. It will be appreciated that this assists in making the content easier to navigate.

In one example, the process of presenting interface pages involves determining the selection of one of a number of interaction response options in accordance with user input commands and then using the selected interaction response option to select a next interface page or determine the browser instruction to be generated.

Thus, it will be appreciated from the above that the interface code controls the manner and order in which interface pages are presented and the associated actions that are to be performed. The interface code also specifies how the browser is controlled, which can be achieved by having the interface code define the browser instructions to be generated, in one example, defining a respective browser instruction for each of a number of response options. This could be achieved by having the interface code include a script for generating the browser instructions, or could include scripts defining the browser instructions, which form part of the interface code and can simply be transferred to the browser as required. Thus all browser instructions required to interact with the content are defined within the interface code, meaning the interface application is able to generate an appropriate instruction for any required interaction.

The user interface is typically presented audibly and/or visually. If presented visually, this is typically presented in a visually simplified form, which can involve using a single colour font on a different and contrasting single colour background, such as a dark font on a light background, a light font on a dark background, a high contrast font and/or using an oversized font. This technique makes it relatively easy for a visually impaired person to view the interface.

In one example, the content address is a Universal Resource Locator and the content code includes HTML code. However, this is not essential and other content addresses and/or codes could be used. The object model is typically a Document Object Model but may also include a style model.

Figure 1B:
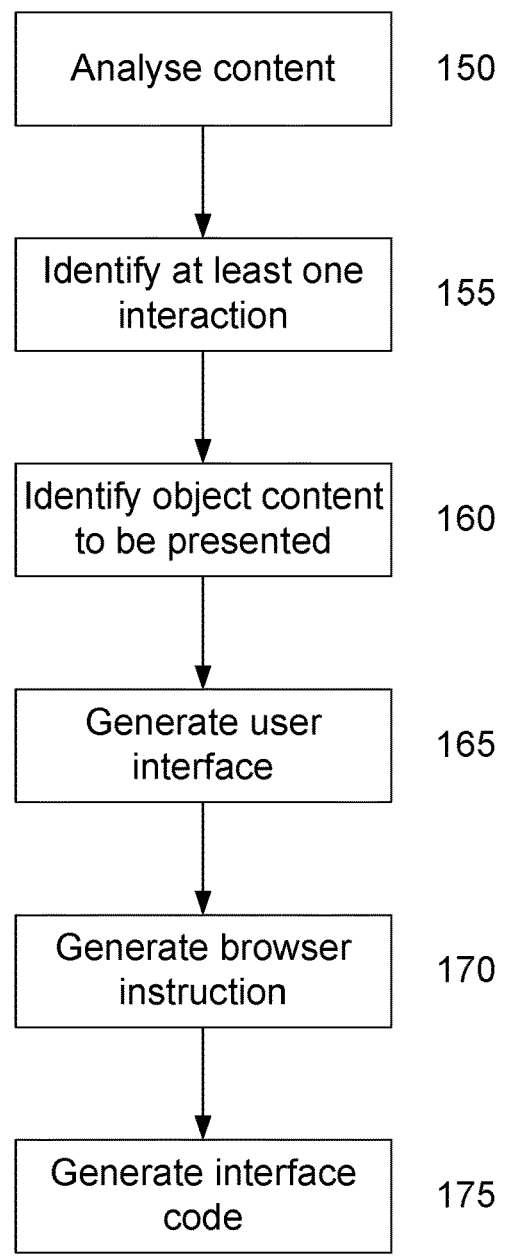
FIG. 1B is a flow chart of an example of a process for generating interface code.

As previously discussed, the interface content can be created based on knowledge of the content and typical user interactions with the content. This can be performed using manual and/or automated techniques and an example process for creating interface code will now be described with reference to FIG. 1B.

In this example, at step 150, content is analysed, with this being used to identify one or more interactions to be performed and any object content to be presented to the user as part of this process, at step 155 and 160 respectively. These processes can be performed utilising a substantially manual process in which an operator accesses and reviews the content, making a manual selection of interactions that need to be performed and the content to be presented. However, alternatively this can be performed in an automated or semi-automated fashion, for example by monitoring multiple interactions of users with the content as part of normal day to day interactions, to identify common tasks which users perform. This can include monitoring specific interactions, such as selection of links, entering of information or the like, and can also include examining which content is viewed by the user, for example using eye-tracking techniques or the like, as will be appreciated by persons skilled in the art.

At step 165 a user interface to be presented to the user is generated. The interface can be generated in any appropriate manner and can involve having an operator specify the content that is to be presented and how this should be presented such as a layout of content in a user interface and/or an audible presentation sequence. This can also include identifying potential user responses to the presentation of the content, allowing these to be defined as appropriate response options. Typically this process is guided by providing a number of templates which specify how content should be presented, with a respective one of the templates being selected to allow the interface to be generated using the template.

At step 170, any required browser instructions, such as instructions to cause the browser to perform actions, or provide relevant object content, are generated. The browser instructions are created either by having the operator define the instruction, for example by creating appropriate code and/or by selecting one or more predefined instructions.

Following this, at step 175 interface code is generated, which is indicative of the interface and the browser instruction can then be generated. Thus, the interface code defines the interface that is to be presented, including any object content that is required to display the content, the response options associated with the interface, and any browser instructions required to implement desired user interactions.

Typically this process is performed repeatedly allowing a sequence of interfaces to be created allowing desired sequences of interactions to be performed so that relevant tasks can be completed by a user using the interfaces.

Accordingly, it will be appreciated that this provides a mechanism for allowing an interface and associated interface responses to user inputs to be created through analysis of the content. This can be performed in a manual fashion, for example by having an operator review the content and assess the interactions that are to occur and the content that needs to be viewed, or can be performed in an automated or semi-automated fashion, for example using an artificial intelligence to examine interaction with the website by a number or users.

A number of further features will now be described.

In one example, the method includes generating interface code by analysing content to identify object content to be presented to the user, identifying an object containing the object content, defining an object request in accordance with the identified object and object content and generating interface code in accordance with the object request. Thus, an operator or automated process will identify the object content that is to be presented and then generate the request which when executed by the interface application is used to retrieve the respective content from the browser application. The object content is typically identified on the basis of the object containing the object content, thereby allowing the browser application to readily identify the relevant content from the generated object model. It will be appreciated that this allows the content to be identified irrespective of the final layout of a particular webpage.

The method typically involves defining the object request by displaying a list of predefined object requests, each having associated predefined code, selecting one of the predefined object requests and then generating the interface code using the associated predefined code. Thus, standard code indicative of requests for particular object content can be created with these then simply being selected and/or modified as required, in order to allow these to be used to define the interface code.

The interface pages can be created in a similar manner. In this regard, it is desirable for interface pages to be generated in a consistent manner, irrespective of the nature of the content, and this is therefore typically driven using templates. Accordingly, the method typically includes generating the interface by creating a template for presenting the object content and/or presenting available user inputs and then generating the interface code in accordance with the template and in particular to embody the template. Again, this can be achieved by displaying a list of predefined templates, each having associated predefined code, selecting one of the predefined templates and generating the interface code using the associated predefined code.

In order to ensure content can be presented in an understandable manner, in one example, the interface code is created so as to allow content to be translated into a form which is more readily presentable on the interface. In order to achieve this, the method typically includes selecting a content item from within the object content to be displayed, defining an interface item corresponding to the selected content item and generating the interface code in accordance with the interface item. Thus, for example, this allows a translation between a piece of content and a more readily understandable interface item such as replacing an icon with a spoken word or similar. Again, this is typically achieved by displaying a list of predefined interface items, each having associated predefined code, selecting one of the predefined interface items and generating the interface code using the predefined code.

Finally, it is possible to identify interactions with the content, determining instructions for the interactions and then generating the interface code using the instructions. In one example, this is achieved by displaying predefined interactions having associated code, selecting one of these and then generating the code using the associated predefined code. Thus, the user can define interactions simply by selecting the type of interaction with interface code being automatically created.

It will be appreciated that these processes can be repeated, allowing multiple interface pages to be created, with the pages being provided in defined sequences to thereby represent tasks that can be performed in respect of the content.

Figure 2:
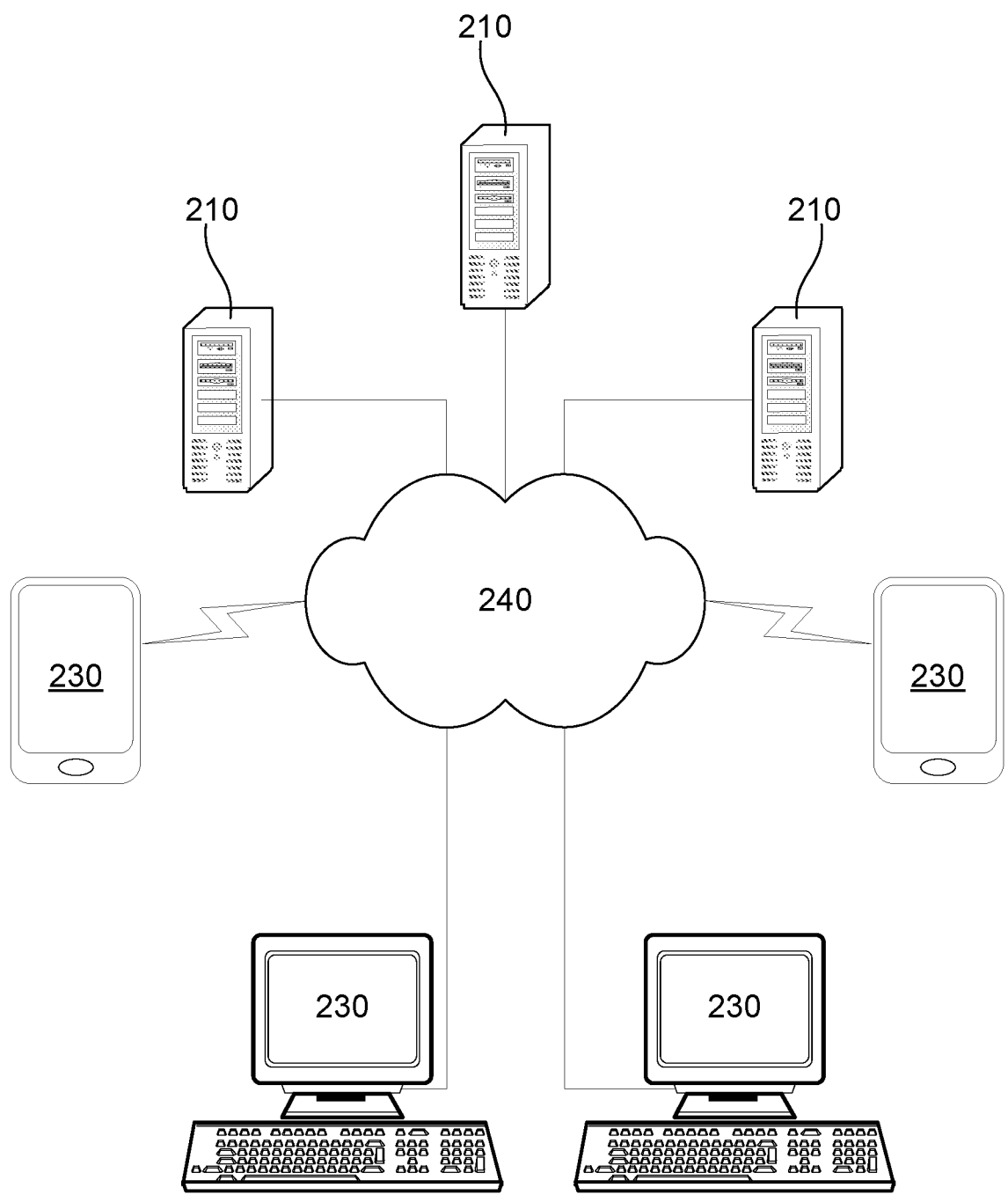
FIG. 2 is a schematic diagram of an example of a computer architecture.

As mentioned above, in one example, the process is performed by one or more computer systems operating as part of a distributed architecture, an example of which will now be described with reference to FIG. 2.

In this example, a number of processing systems 210 are provided coupled to one or more computer systems 230, via one or more communications networks 240, such as the Internet, and/or a number of local area networks (LANs).

Any number of processing systems 210 and computer systems 230 could be provided, and the current representation is for the purpose of illustration only. The configuration of the networks 240 is also for the purpose of example only, and in practice the processing systems 210 and computer systems 230 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

In this example, the processing systems 210 are adapted to provide access to content and interface code, allowing content and an interface to be displayed via the computer systems 230, and to allow user interaction with the content, via the interface. Whilst the processing systems 210 are shown as single entities, it will be appreciated they could include a number of processing systems distributed over a number of geographically separate locations, for example as part of a cloud based environment. Thus, the above described arrangements are not essential and other suitable configurations could be used.

Figure 3:
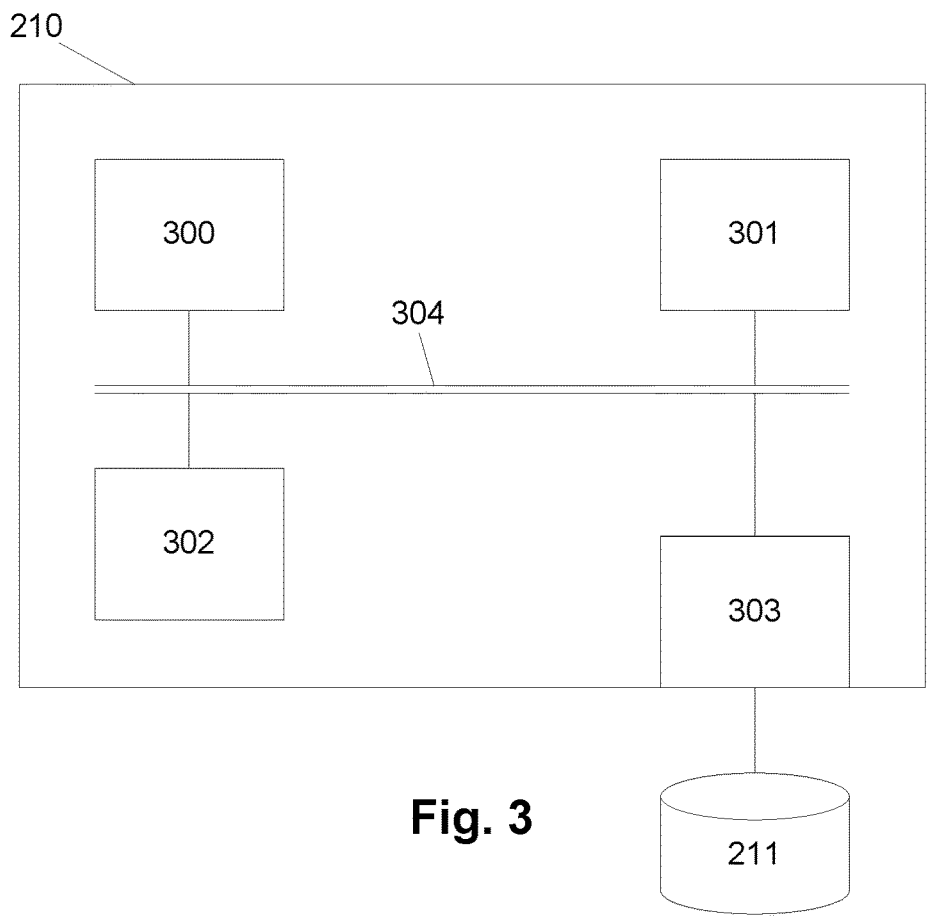
FIG. 3 is a schematic diagram of an example of a processing system of FIG. 2.

An example of a suitable processing system 210 is shown in FIG. 3. In this example, the processing system 210 includes at least one microprocessor 300, a memory 301, an optional input/output device 302, such as a keyboard and/or display, and an external interface 303, interconnected via a bus 304 as shown. In this example the external interface 303 can be utilised for connecting the processing system 210 to peripheral devices, such as the communications networks 240, databases 211, other storage devices, or the like. Although a single external interface 303 is shown, this is for the purpose of example only, and in practice multiple interfaces using various methods (eg. Ethernet, serial, USB, wireless or the like) may be provided.

In use, the microprocessor 300 executes instructions in the form of applications software stored in the memory 301 to allow the required processes to be performed. The applications software may include one or more software modules, and may be executed in a suitable execution environment, such as an operating system environment, or the like.

Accordingly, it will be appreciated that the processing systems 210 may be formed from any suitable processing system, such as a suitably programmed PC, web server, network server, or the like. In one particular example, the processing system 210 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 4:
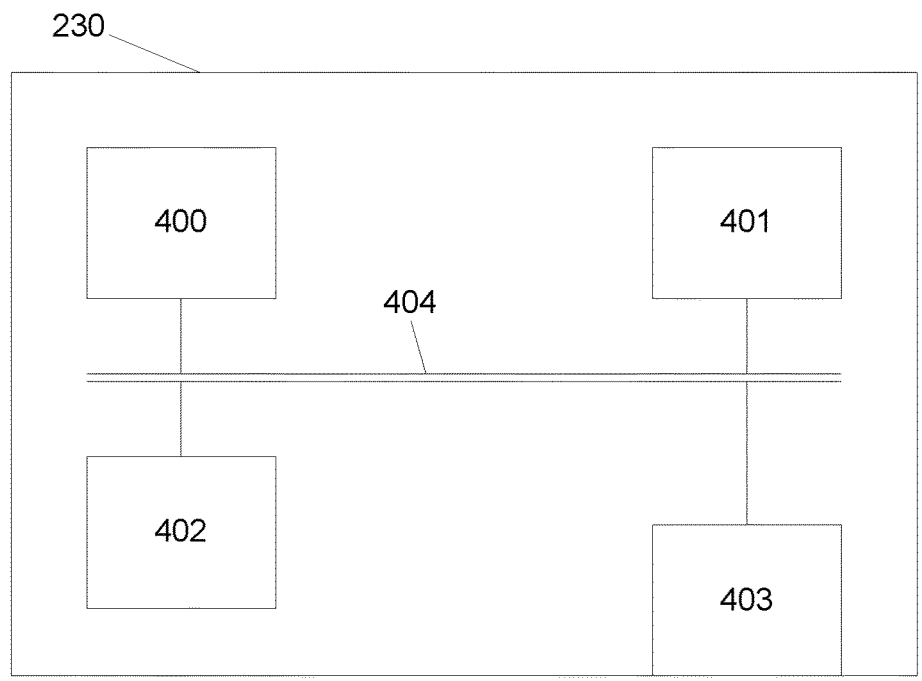
FIG. 4 is a schematic diagram of an example of a computer system of FIG. 2.

As shown in FIG. 4, in one example, the computer system 230 includes at least one microprocessor 400, a memory 401, an input/output device 402, such as a keyboard and/or display and an external interface 403, interconnected via a bus 404 as shown. In this example the external interface 403 can be utilised for connecting the computer system 230 to peripheral devices, such as the communications networks 240 databases, other storage devices, or the like. Although a single external interface 403 is shown, this is for the purpose of example only, and in practice multiple interfaces using various methods (eg. Ethernet, serial, USB, wireless or the like) may be provided.

In use, the microprocessor 400 executes instructions in the form of applications software stored in the memory 401, and to allow communication with one of the processing systems 210.

Accordingly, it will be appreciated that the computer system 230 could be formed from any suitably programmed processing system and could include suitably programmed PCs, Internet terminal, lap-top, or hand-held PC, a tablet, a smart phone, or the like. However, it will also be understood that the computer system 230 can be any electronic processing device such as a microprocessor, microchip processor, logic gate configuration, firmware optionally associated with implementing logic such as an FPGA (Field Programmable Gate Array), or any other electronic device, system or arrangement.

Examples of the processes for presenting and interacting with content in the form of a webpage, via an interface, will now be described in further detail. For the purpose of these examples it is assumed that one or more respective processing systems 210 are servers, and that two different types of server are provided, including a web server 210.1 and an interface server 210.2. In one example, the web server 210.1 hosts one or more websites that are accessed by the computer systems 230 allowing the user to access the website, whilst the interface server 210.2 is provided to allow the computer systems 230 to present interfaces to facilitate interaction with the website. The servers 210 typically execute processing device software, allowing relevant actions to be performed, with actions performed by the server 210 being performed by the processor 300 in accordance with instructions stored as applications software in the memory 301 and/or input commands received from a user via the I/O device 302. It will also be assumed that actions performed by the computer systems 230, are performed by the processor 400 in accordance with instructions stored as applications software in the memory 401 and/or input commands received from a user via the I/O device 402.

However, it will be appreciated that the above described configuration assumed for the purpose of the following examples is not essential, and numerous other configurations may be used. It will also be appreciated that the partitioning of functionality between the different processing systems may vary, depending on the particular implementation.

A schematic diagram illustrating differences in the functionality of a traditional and a facilitated web browsing process and will now be described with reference to FIGS. 5A and 5B.

Figure 5A:
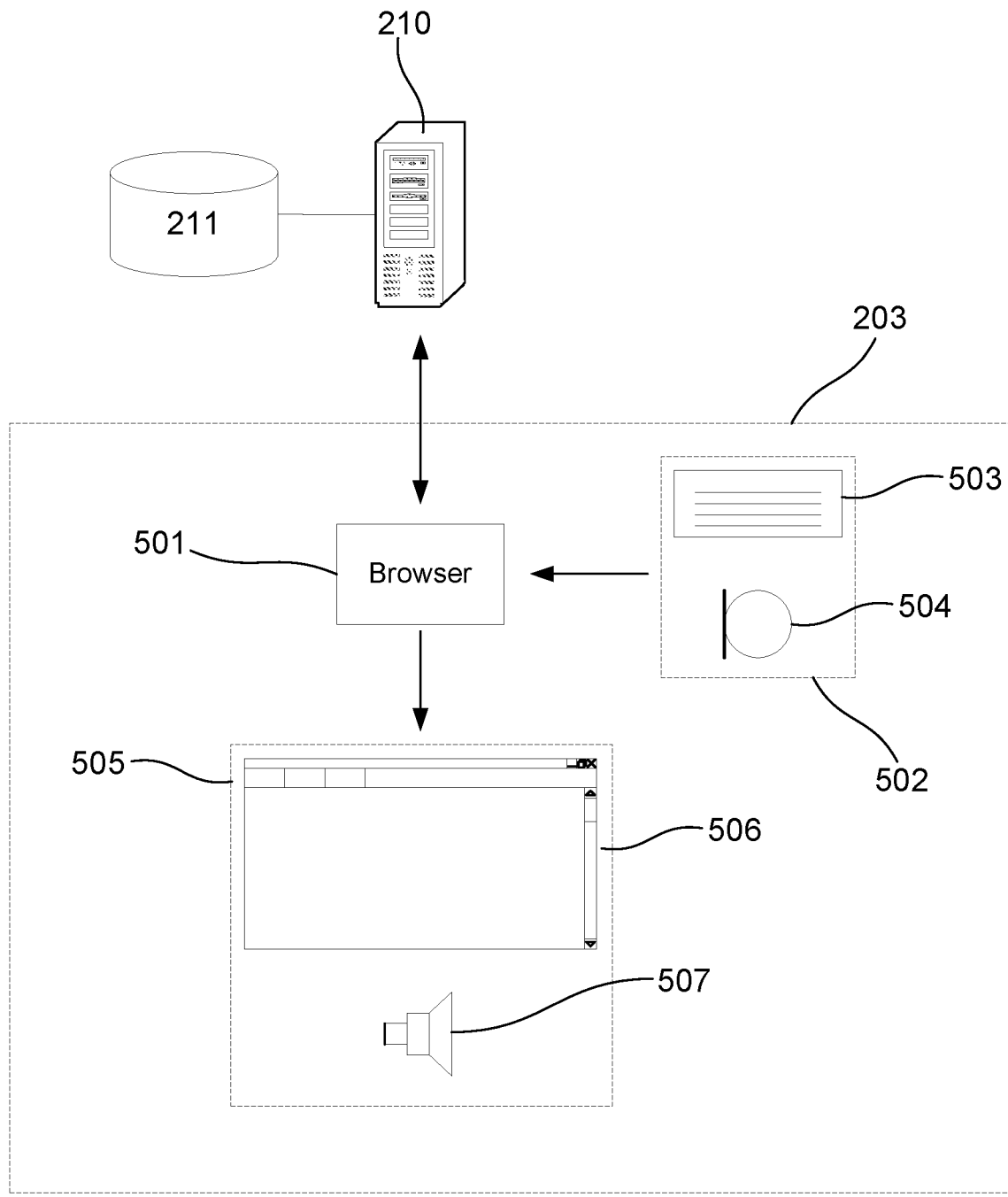
FIG. 5A is a schematic diagram of an example of the functional operation of a traditional web browser.

In the traditional application shown in FIG. 5A, a browser application 501 executed by the computer system 230 receives inputs from input devices 502, such as a keyboard 503 and mouse 503 and optionally a microphone 504 if speech recognition is enabled. The browser interprets user inputs and interacts with the web server 210.1 in order to retrieve a webpage, which can then be provided via outputs 505, such as a GUI 506 displayed on a display and/or speaker 507.

Figure 5B:
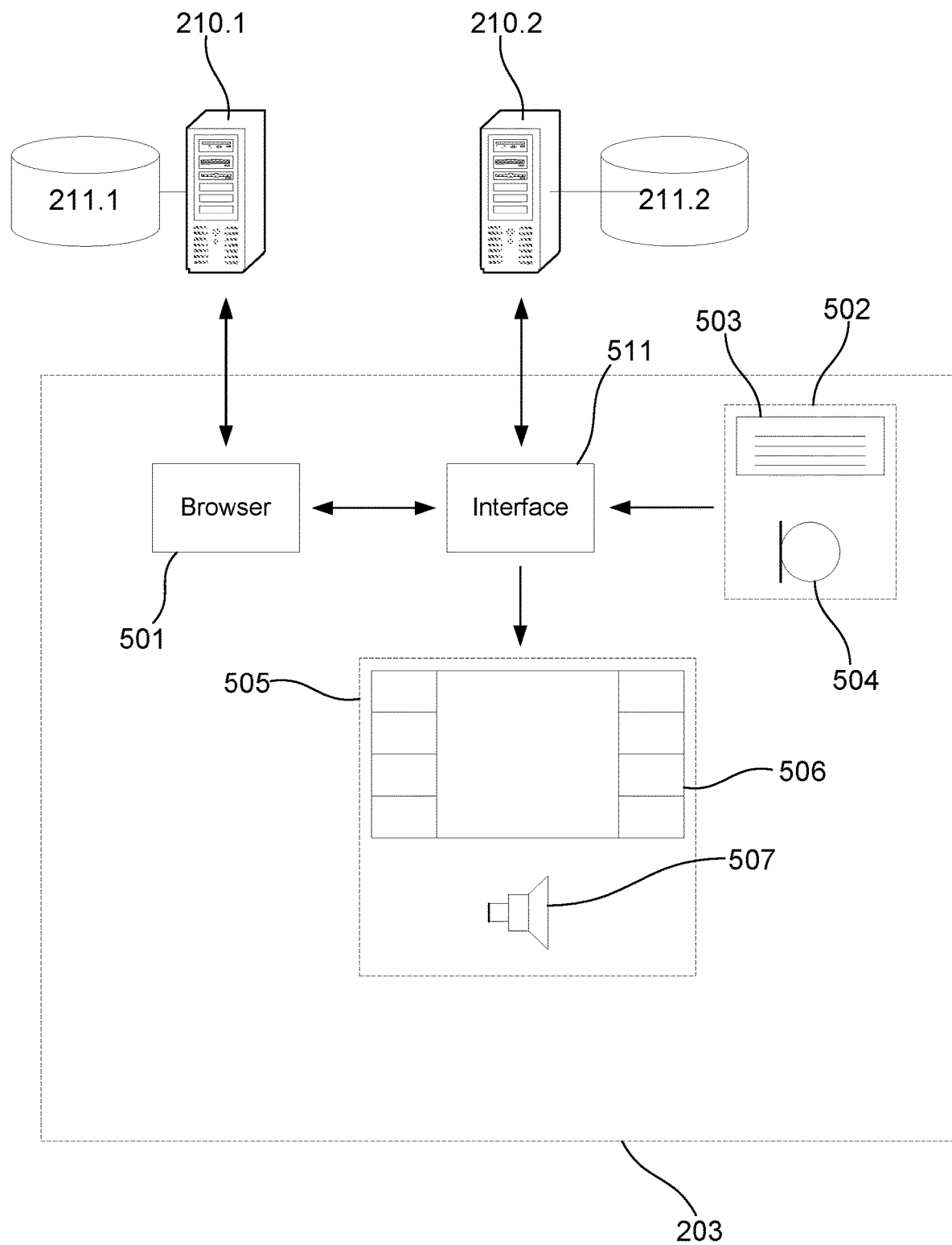
FIG. 5B is a schematic diagram of an example of the functional operation of an interface for facilitating user interaction with a webpage.

In contrast to this, in the facilitated arrangement of FIG. 5B, the browser application 501 still obtains content from the web server 210.1 but does not interface with inputs or outputs directly. Instead, the browser application 501 receives inputs from or provides content to an interface application 511 typically executed by the same computer system 230, although it would be appreciated a different computer system could be used. The interface application 511 communicates with the interface server 210.2 to receive interface code, as well as receiving inputs from the input devices 502, such as a keyboard 503 and microphone 504, mouse, touch screen, or the like, providing outputs via the output devices 505, typically including a modified user interface 506 and/or microphone 507.

Accordingly, it will be appreciated that in the above example, the browser application continues to be the sole point of interaction with the web server, so that from the web server's perspective, the process of hosting and serving a website is unchanged. However, in the facilitated example, the browser does not actually display the webpage or receive user inputs directly. Instead all user interaction is via the interface application, allowing the interaction to be tailored to make interaction more straightforward, for example making this more appropriate for visually impaired users, hands-free operation or the like.

Figure 6A:
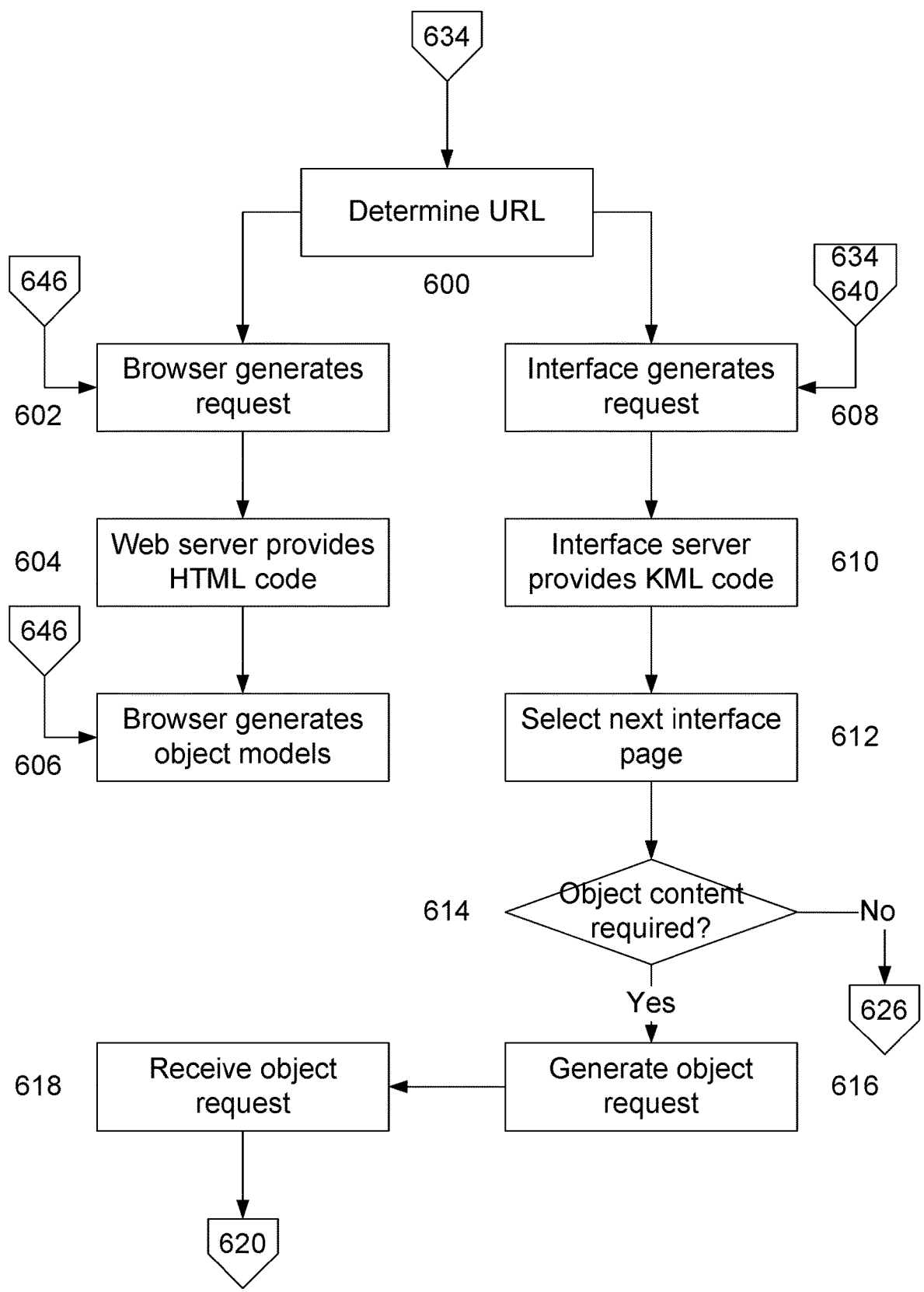
FIGS. 6A to 6C are flow charts of a specific example of a process for facilitating user interaction with a webpage.
Figure 6B:
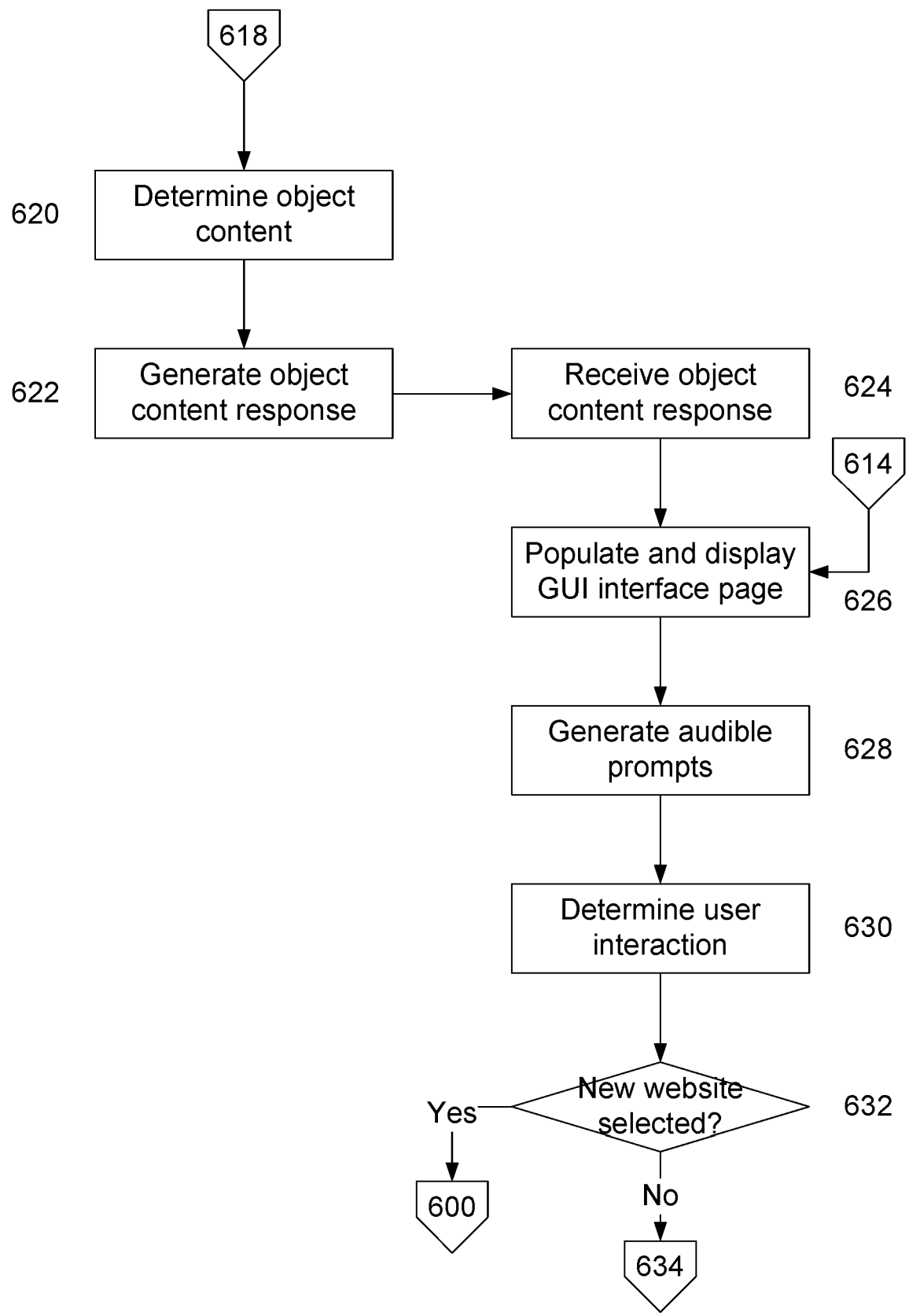
Figure 6C:
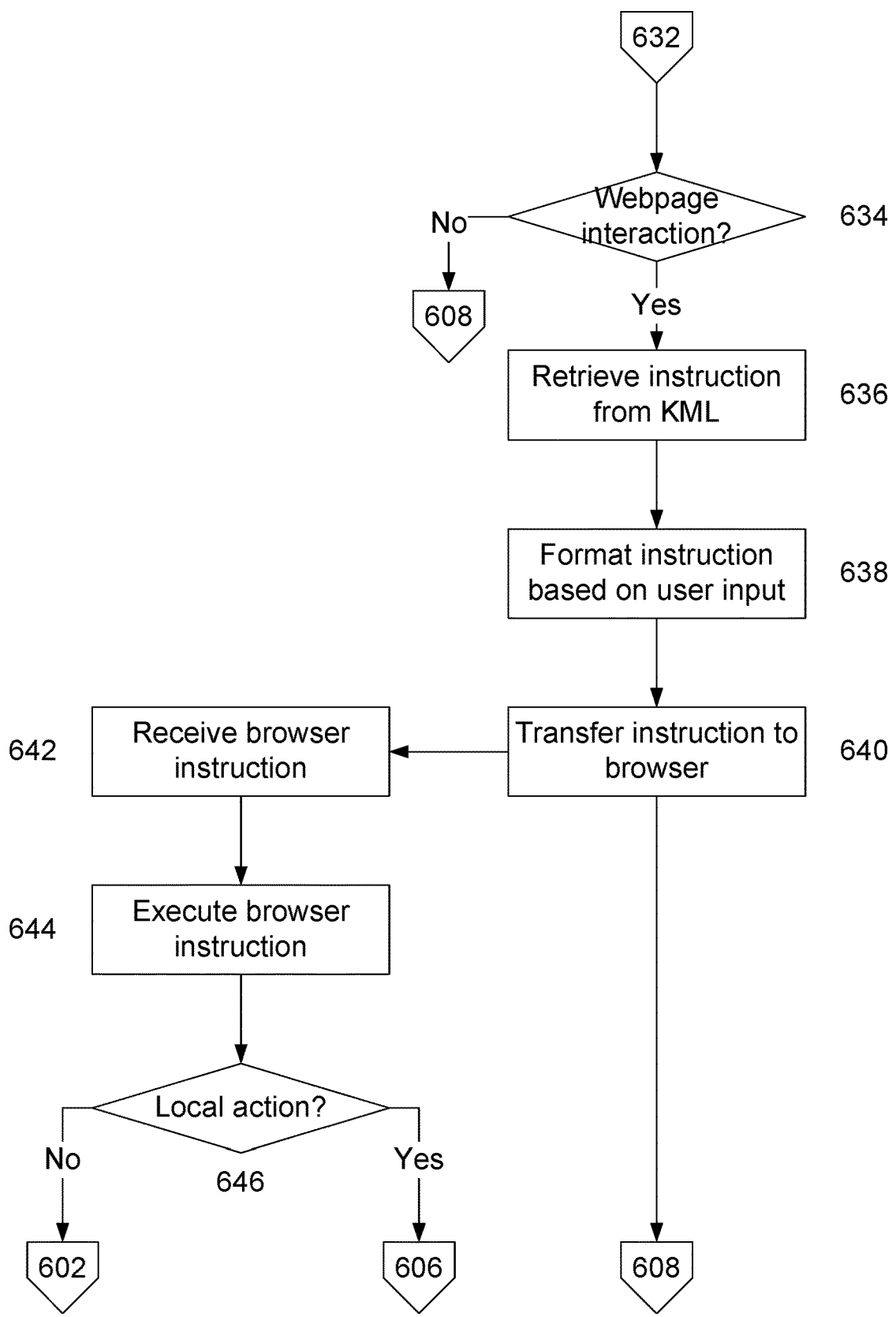

An example of a process for displaying a webpage will now be described in more detail with reference to FIGS. 6A to 6C.

In this example, at step 600 a URL is determined. The URL is determined in any appropriate manner, such as by selecting a hyperlink, manually entering a URL into an address input or the like. The URL is provided to both the browser application 501 and the interface application 511, for example by having selection of a link detected by the browser and interface application, or having the user enter the URL into an interface page, allowing the interface application 511 to transfer this to the browser application 501.

At step 602, the browser application 501 responds to the URL to generate a content request which is sent to the web server 210.1, allowing the web server 210.1 to provide HTML code at step 604. The browser application 501 then parses the HTML code and generates an object model, and in particular a DOM, at step 606. Under normal circumstances, the browser application 501 would also proceed to generate a CSS style object model, followed by a render tree, allowing the browser to render a user interface including the webpage. It will be appreciated however that in this instance, this is not required.

Concurrently with this, the interface application 511 generates an interface request at step 608, with this being transferred to the interface server 210.2, allowing the interface server to provide interface code, which is generally hereinafter referred to as KML. At step 612 the interface application parses the KML code and identifies a next interface page to be displayed. At step 614 the interface application determines if object content is required for the next interface page, and if not the process moves on to step 626.

Otherwise, at step 616, the interface application 511 generates an object request based on instructions in the KML code, with the object request being transferred to the browser application 501 at step 618. The browser application 501 determines object content from the object model at step 620, generating an object content response including the content at step 622. The object content response is transferred to the interface application 511, which receives this at step 624, allowing the content to be extracted therefrom and used to populate the interface page.

The interface application 511 then presents the interface page, either graphically at step 626 and/or via audible prompts at step 628, which effectively involves reading out text from the interface page. As previously mentioned, the graphical interface page is typically a simplified page including minimal information and examples will be described in more detail below with reference to FIGS. 7A to 7F. Typically however, the interface page includes information, such as a statement or question, and optionally one or more response options.

At step 630 one or more user inputs are provided, allowing a user interaction to be determined by the interface application 511. If it is determined that the user interaction corresponds to selection of a new website or webpage, for example through selection of a website link at step 632, the process returns to step 600, allowing a new webpage to be requested. Otherwise, at step 634, the interface application 511 determines if the user input results in interaction with the webpage using the KML code. For example, certain inputs may merely lead to display of further interface pages in which case the process can return to step 608 allowing further KML code to be retrieved corresponding to a next interface page, before the next interface is presented. It will be appreciated that, in practice, the retrieval of the further KML code may or may not result in a further request to the interface server 210.2, such that the KML code for the next interface page may have been pre-fetched as part of a previous interface request and already be available to the interface application. For example, the interaction application can download all the KML code required for interaction with a website or webpage during the initial stage of the interaction.

Otherwise, if it is determined that the interaction corresponds to an interaction with the webpage, then the interface application 511 retrieves a browser instruction from the KML code at step 636, with the instruction optionally being formatted based on supplied user input at step 638. For example, if the user is submitting information via the webpage, the instruction could correspond to selection of an interactive element, such as a submit button, to cause the browser application to perform "get" or "post" operation including relevant text input supplied by the user. The instruction is transferred to the browser application 501 at step 640 with the browser application 501 receiving the instruction at step 642 and executing the instruction at step 644.

If the executed instruction results in a local action which does not require interaction with the web server 210.1, then at step 646, the browser application 501 will typically update the object model at step 606, for example to incorporate entered information into the object model of the webpage. Thus, if the user is required to enter a value into the textbox on a webpage, the instruction could update the corresponding value in the object model with relevant text input supplied by the user. In contrast, if the interaction results in a non-local action, this will typically involve having the browser application 501 generate a browser request at step 602, which is provided to the web server 210.1 to allow a response such as further HTML code to be provided at step 604. Simultaneously, with this the interface application 511 will return to step 608, allowing further KML code to be retrieved if required, as described above, before a next interface page is presented.

Thus it will be appreciated that each interaction with the webpage is performed by presenting a respective interface page, allowing a user to provide a response with this being used to trigger the interaction before a next interface page is displayed.

An example of this will now be described with reference to example interface content shown in FIGS. 7A to 7F. In this example, the content being viewed by the user corresponds to a travel website providing information regarding transit services available in a city.

Figure 7A:
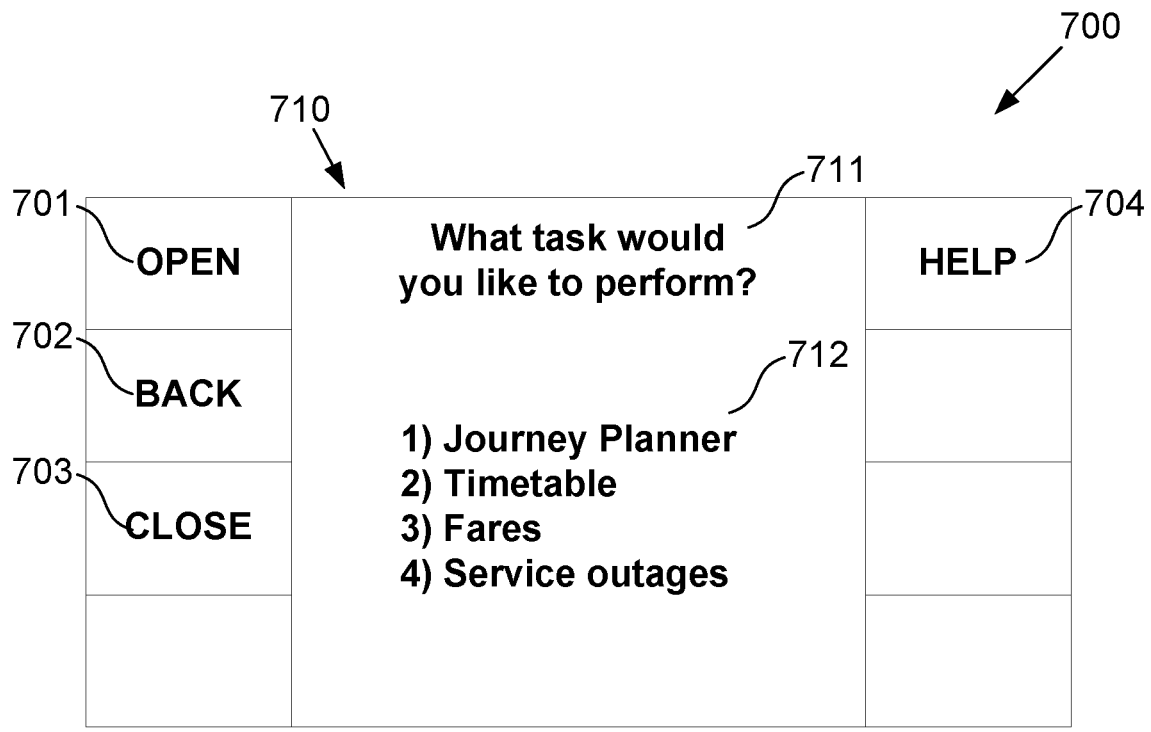

When the user initially navigates to the website, the user might be presented with a user interface similar to that shown in FIG. 7A. In this example, the user interface 700 includes a number of menu options, in this example including control inputs 701, 702, 703, 704 corresponding to general actions such as "open", "back", "close" and "help". It will be appreciated that any such commands may be provided in the menu options, and that these may be provided consistently across the interface pages, allowing a user to more easily perform common actions.

Additionally, the interface includes a window 710 displaying content to the user. The content can include a mixture of defined interface content specified within the KML code, as well as webpage content retrieved from the browser application 501 based on instructions within the KML code.

In this first example, when the user initially navigates to the transit services page, the user is presented with a question 711 asking the user what task they would like to perform. In this instance, four possible tasks associated with the webpage have been defined, with associated response options 712 being displayed allowing the user to select one of these using verbal commands, or by selecting via the GUI. In this instance, the question followed by the appropriate inputs, which in this instance includes four options including "journey planner", "timetable", "fares" and "service outages", although it will be appreciated that a wide range of different options could be defined.

The content populating these response options could be obtained from the website but more typically is defined by an operator creating the interface code, and an example of the KML code for displaying the interface is as follows:

```
<INTERFACE MAIN>
    <CONTENT> What task would you like to perform? </CONTENT>
```

```
    <RESPONSE> Journey Planner </RESPONSE>
        <ACTION> Display Planner Page 1 </ACTION>
    <RESPONSE> Timetable </RESPONSE>
    <RESPONSE> Fares </RESPONSE>
    <RESPONSE> Service Outages </RESPONSE>
</INTERFACE MAIN>
```

The interface would typically be displayed graphically as shown in FIG. 7A, and in an audible fashion by reading out the associated text, for example by reading out the question and then each response option, with an associated number, allowing the user to make a selection by selecting an appropriate number, or by providing another suitable input, such as by saying "journey planner", "planner", "plan my journey" or any other phrases defined in KML for each option. The response could also be specified using a keyboard or other appropriate interface.

Figure 7B:
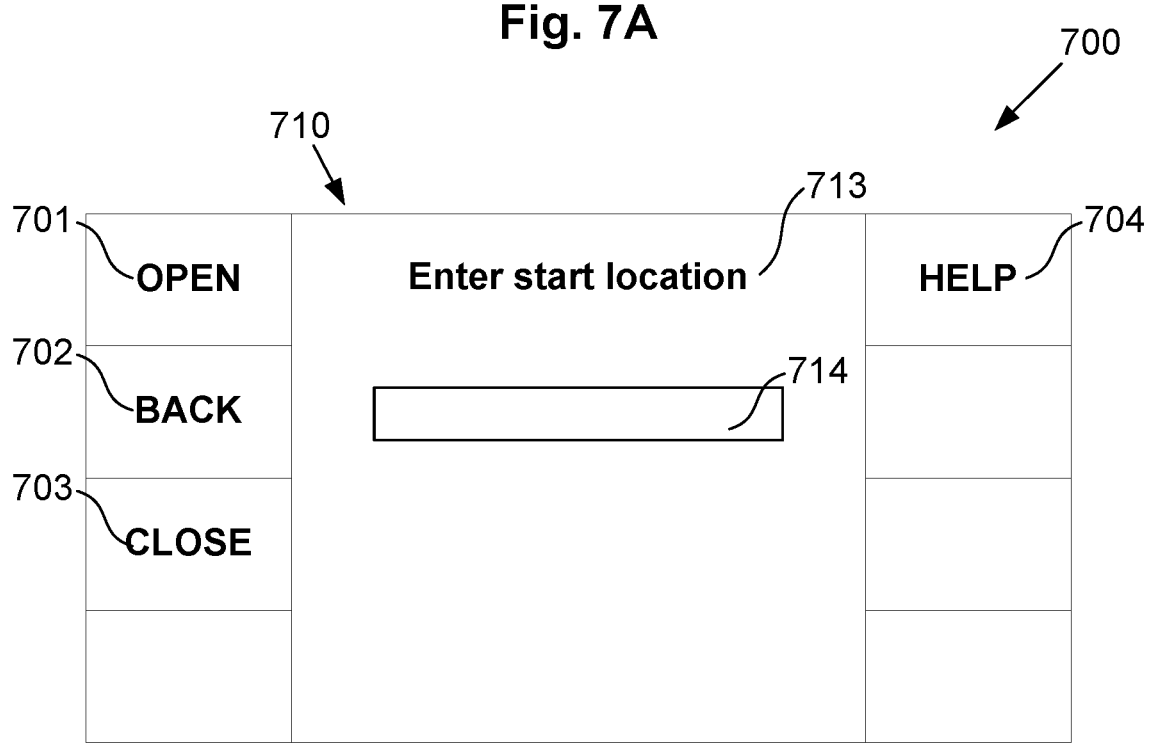

For example, assuming the user wishes to use the journey planner, the user selects response option "1". The KML code then defines the action to be taken for the respective selected option, in this instance causing an interface page "Planner Page 1" to be displayed as shown in FIG. 7B, including a request for the user to enter a start location 713 via a text input box 714. Text for defining the start location could be provided using a keyboard or verbally.

Figure 7C:
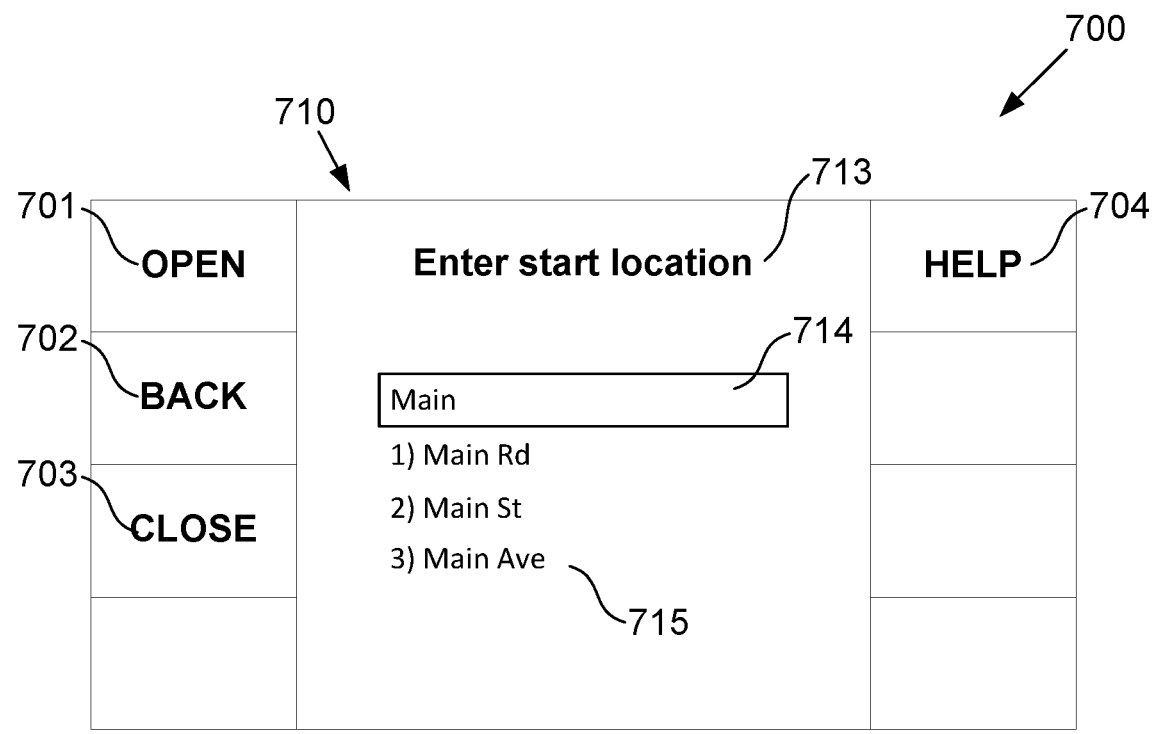
Figure 7D:

In one example, as a start location is provided, the webpage may perform an auto-complete operation, displaying a dropdown list of suitable start locations. If the website operates in this manner, browser instructions could be generated to cause the text entered by the user to be submitted via the corresponding field on the website as the text is entered with possible start locations being returned as shown in FIG. 7C. In this example, a partially completed text entry box 714 has a number of possible response options 715 displayed below, allowing a user to select one of these to complete the text entry process. In a similar manner, the user can enter a destination and start time, as shown in FIGS. 7D and 7E.

As each of the start destination and time fields are completed, this information can be populated on the webpage before a completed form is submitted to the web server 210.1 by the web browser application 501, based on instructions from the interface application 511. The web server 210.1 will then typically generate a webpage including the journey plan which is provided to the web browser application 501 allowing the browser application 501 to construct the relevant DOM. Having constructed the DOM, the user interface application 511 will request content from a journey plan object of the webpage, with this being returned by the browser application 501, allowing the content to be parsed and prepared for display. In this regard, often the content is displayed on the website graphically, so graphical elements, such as icons included in the returned content can be replaced with corresponding wording, as shown in FIG. 7F.

Accordingly, it will be appreciated that in the above described process, interaction with the webpage is performed by the browser application based on HTML code provided by the web server 210.1, whilst in parallel the interface application displays an interface and interprets user inputs based on KML code provided by the interface server 210.2.

Figure 8A:
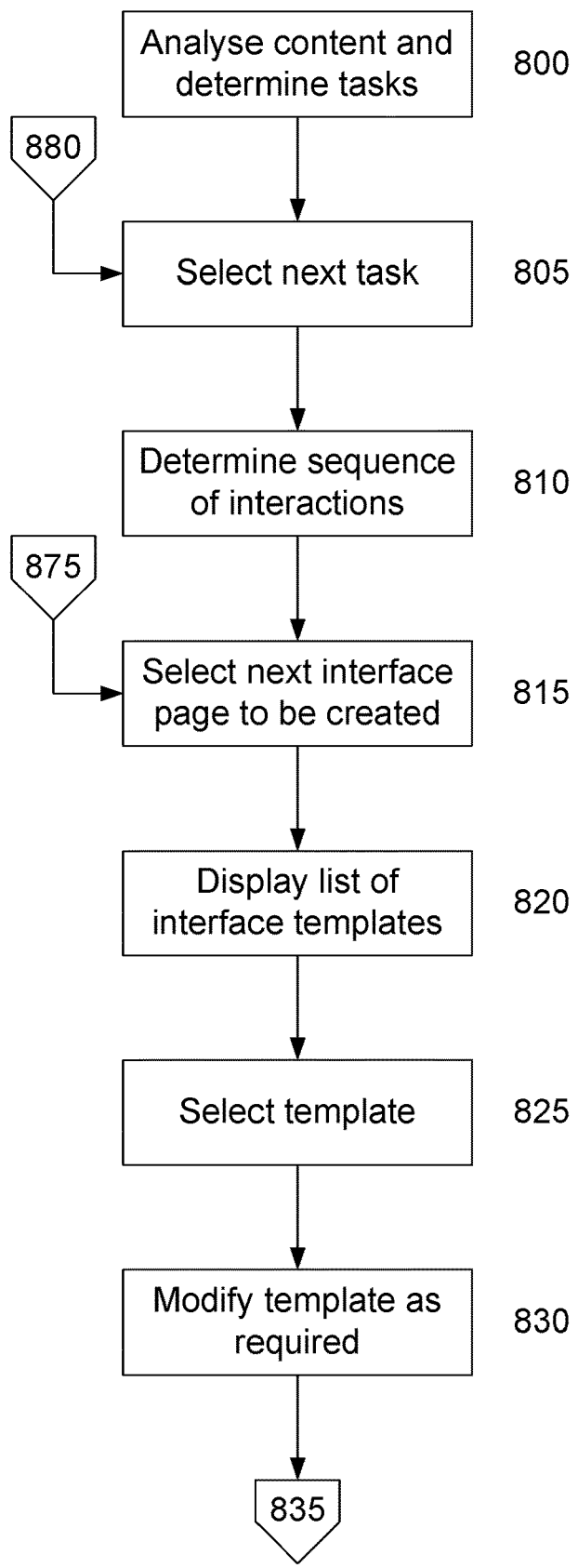
FIGS. 8A to 8C are a specific example of a process for generating interface code.
Figure 8B:
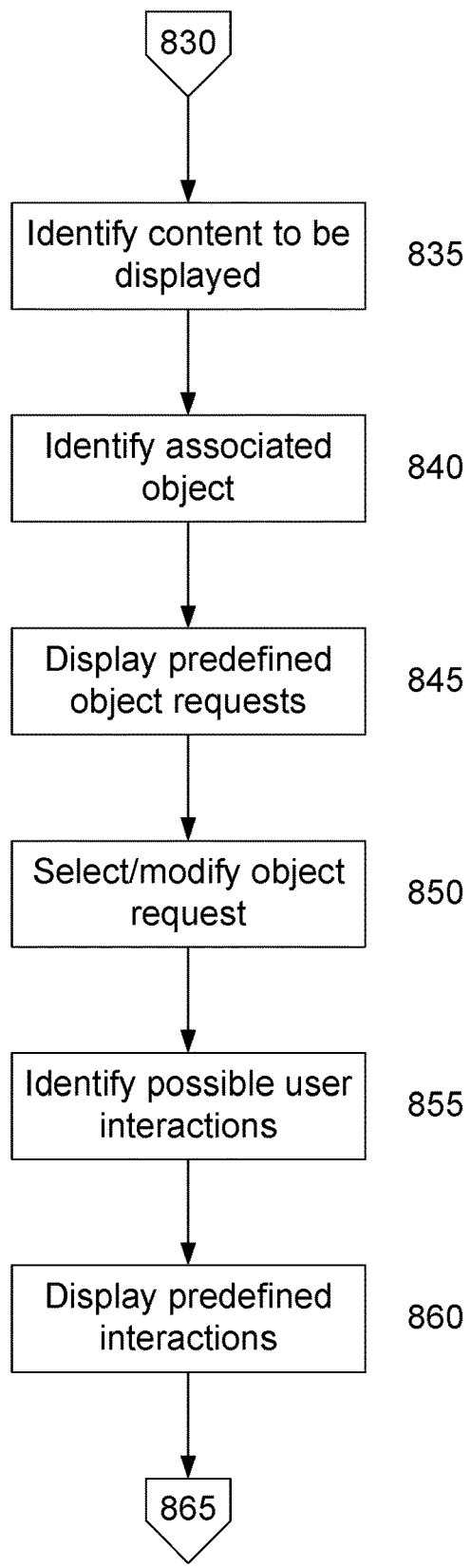
Figure 8C:
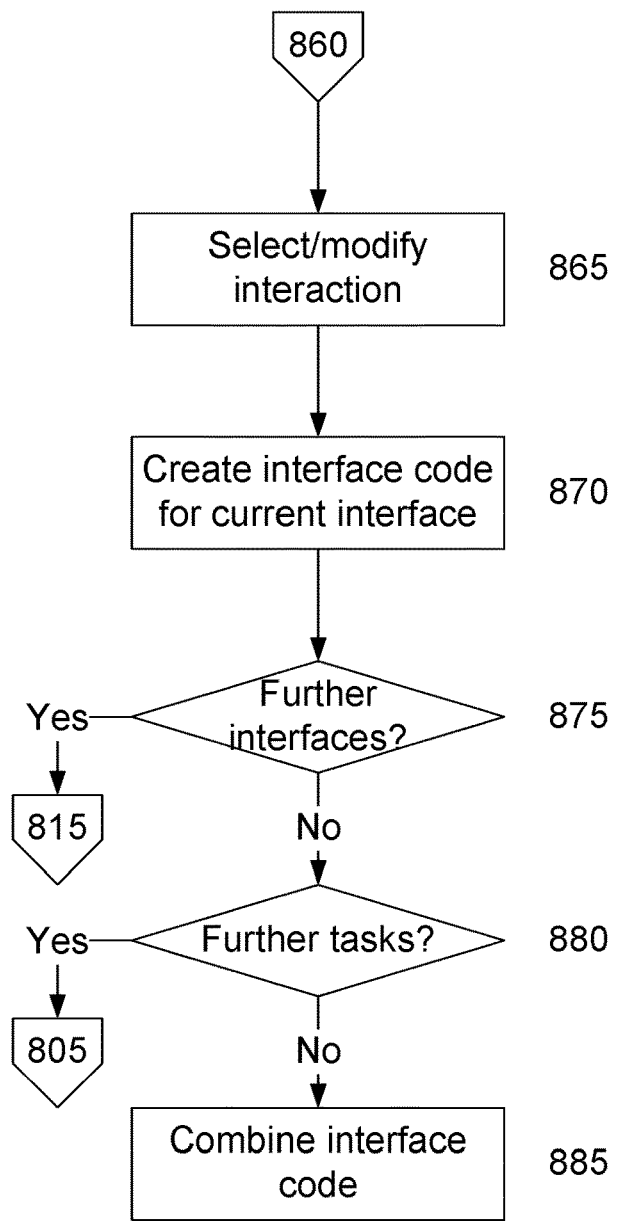

An example of a process for creating interface code will now be described in further detail with reference to FIGS. 8A to 8C.

Whilst this example will focus on having an operator manually create the interface code, it will be appreciated that a similar automated procedure could be performed and reference to manual procedure is not intended to be limiting.

In this example, at step 800 website content is analysed to ascertain different tasks which can be performed, such as the journey planner, timetable, fares and service outage tasks of the previous example. Following this a next task is selected at step 805, with this being analysed at step 810 to determine a typical sequence of interactions that needs to be performed by a user in order to complete the task. The sequence of interactions will typically involve displaying information, making selections and/or data entry steps, such as the start location, destination location, start time and date inputs and results output of the previous example.

At step 815, a next interface page to be created is selected, with this being manually defined by the operator. As part of this, at step 820 a list of interface templates can be displayed allowing the user to select an appropriate one of these at step 825. Thus, for example, in the case of the journey planner sequence, the next interface page after the first page corresponds to a text entry field and accordingly the user can select a text entry template. The template can then be modified as required at step 830, for example allowing the user to enter a field name, add additional text entry fields, define speech recognition rules, such as phrases associated with different response options, or the like.

During this process, the operator determines if content from the webpage needs to be displayed, at step 835, and if so, the operator can analyse the HTML code of webpage and identify the object containing the relevant content at step 840. A list of predefined object requests can then be displayed at step 845, allowing the user to select and optionally modify an appropriate object request at step 850, for example defining the particular object code with reference to corresponding tags in the HTML file.

Following this, possible user interactions are identified at step 855, such as entering text, or selecting one of a number of response options. A list of predefined interactions can be displayed at step 860 allowing the operator to select and/or modify the interaction at step 865. Thus, for example, this could include defining how the text entry field is to respond to input text.

Having done this, interface code can be created for the current interface page at step 870. The interface code will be based on defined code for each of the templates, the content request and the interactions, with the code being populated if required by relevant customisations entered by the user, such as details of the name of fields or response options, voice recognition response rules, or the like. It will be appreciated that this approach allows interface code for presenting the relevant interface page to be created substantially automatically with little, if any, operator input, other than selection of appropriate combinations of templates, interactions or the like.

At step 875 it is then determined if further interface pages are required to complete the sequence of interactions for the current task, and if so, the process returns to step 815. Otherwise, it is determined if tasks need to be defined at step 880 and if so, the process returns to step 805. Otherwise, the interface code for the different interface pages is combined to form the final KML code at step 885.

It will be appreciated that the above described example therefore provides a mechanism to allow the KML code to be constructed. The use of predefined materials, such as templates and instructions, vastly simplifies the creation process, whilst also allowing the interfaces to be presented in a more consistent fashion, which is important in ensuring ease of navigation and understanding of the content for the user.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A method for facilitating user interaction with content presented by a computer system, the method including, in a suitably programmed computer system:
   a) using a browser application to:
      i) obtain content code from a content server in accordance with a content address, the content code representing content; and,
      ii) construct an object model indicative of the content from the content code, the object model including a number of objects and each object having associated object content, and the object model being useable to allow the content to be displayed by the browser application;
   b) using an interface application to:
      i) obtain interface code from an interface server at least partially in accordance with the content address;
      ii) obtain any required object content from the browser application;
      iii) present a user interface to the user in accordance with the interface code and any required object content, the user interface being at least partially indicative of at least one of:
         (1) at least some of the object content; and,
         (2) at least one available user input;
      iv) determine at least one user input in response to presentation of the user interface; and,
      v) generate a browser instruction in accordance with the user input and the interface code; and,
   c) using the browser application to execute the browser instruction to thereby interact with the content.

2. A method according to claim 1, wherein the interface code defines a plurality of interface pages, and wherein the method includes presenting a number of interface pages in a sequence to thereby allow a task to be performed and wherein the method further includes:
   a) presenting an interface page;
   b) determining the at least one user input in response to the presented interface page;
   c) selecting a next interface page at least partially in accordance with the at least one user input and the sequences of interface pages defined in the interface code; and,
   d) presenting the next interface page to the user.

3. A method according to claim 1, wherein the method includes, in the interface application:
   a) determining required object content for an interface page in accordance with the interface code;
   b) obtaining the required object content; and,
   c) generating the interface page using the required object content.

4. A method according to claim 1, wherein the interface code defines a template for at least one interface page, and wherein the method includes, generating the next user interface page by populating the template using the required object content.

5. A method according to claim 1, wherein the object content includes a number of content items, and wherein the method includes, in the interface application:
   a) identifying one or more interface items corresponding to at least one content item using the interface code; and,
   b) generating the next interface page using the interface items.

6. A method according to claim 1, wherein the interface pages are arranged hierarchically in accordance with a structure of the content.

7. A method according to claim 1, wherein at least one interface page is indicative of a respective interaction and one or more interaction response options, and wherein the method includes, in the interface application:
   a) determining selection of one of the interaction response options in accordance with user input commands; and,
   b) using the selected interaction response option to at least one of:
      i) select a next interface page; and,
      ii) determine the browser instruction to be generated.

8. A method according to claim 1, wherein the interface code at least one of:
   a) defines the browser instructions to be generated;
   b) defines a respective browser instruction for each of a number of response options;
   c) includes scripts for generating the browser instructions; and,
   d) includes scripts defining the browser instructions.

9. A method according to claim 1, wherein the user interface is presented at least one of:
   a) audibly;
   b) visually;
   c) in a visually simplified form;
   d) using a single colour font on a different single colour background;
   e) using a light font on a dark background;
   f) using a dark font on a light background;
   g) using a high contrast colour scheme; and,
   h) using an oversized font.

10. A method according to claim 1, wherein at least one of:
   a) the content address is a Universal Resource Locator and the content code includes HTML code;
   b) the interface code includes a mark-up language code; and,
   c) the object model includes at least one of:
      i) a document object model; and,
      ii) style model.

11. A method according to claim 1, wherein the interaction includes at least one of:
   a) selecting an actionable element;
   b) modifying the content;
   c) submitting a form to the content server;
   d) submitting user input to the content server; and,
   e) requesting further content from the content server.

12. A method according to claim 1, wherein the method includes, using the browser application to:
   a) generate a content request including the content address; and,
   b) provide the content request to a content server, the content server being responsive to the content request to provide the content code.

13. A method according to claim 1, wherein the method includes, using the interface application to:
   a) generate an interface code request including the content address; and,
   b) provide the interface code request to an interface server, the interface server being responsive to the interface code request to provide the interface code.

14. A method according to claim 1, wherein the method includes generating interface code at least in part through an analysis of interactions with the content.

15. A system for facilitating user interaction with content presented by a computer system, the system including a suitably programmed computer system that:
   a) uses a browser application to:
      i) obtain content code from a content server in accordance with a content address, the content code representing content; and,
      ii) construct an object model indicative of the content from the content code, the object model including a number of objects and each object having associated object content, and the object model being useable to allow the content to be displayed by the browser application;
   b) uses an interface application to:
      i) obtain interface code from an interface server at least partially in accordance with the content address;
      ii) obtain any required object content from the browser application;
      iii) present a user interface to the user in accordance with the interface code and any required object content, the user interface being at least partially indicative of at least one of:
         (1) at least some of the object content; and,
         (2) at least one available user input;
      iv) determine at least one user input in response to presentation of the user interface; and,
      v) generate a browser instruction in accordance with the user input and the interface code; and,
   c) uses the browser application to execute the browser instruction to thereby interact with the content.

16. A method for generating interface code usable to facilitate user interaction with content presented by a computer system, the method including, in a suitably programmed computer system:
   a) analyzing the content to identify:
      i) at least some object content to be presented to the user, the object content forming part of an object in an object model, the object model being useable to allow the content to be displayed by a browser application; and,
      ii) at least one interaction to be performed;
   b) generating a user interface to be presented to the user, the user interface being indicative of:
      i) at least some of the object content to be presented to the user; and,
      ii) at least one available user input;
   c) generating a browser instruction for causing the browser application to implement the at least one interaction; and,
   d) generating interface code indicative of the user interface and the browser instruction, the interface code being executable by an interface application to cause the interface application to:

i) obtain any required object content from the browser application;
ii) present the user interface to the user;
iii) determine at least one user input in response to presentation of the user interface;
iv) determine a browser instruction in accordance with the user input; and,
v) provide the browser instruction to the browser application to cause the browser application to execute the browser instruction and thereby interact with the content.

17. A method according to claim 16, wherein the method includes at least one of:
  a) generating interface code by:
    i) analyzing content to identify object content to be presented to the user;
    ii) identifying an object containing the object content;
    iii) defining an object request in accordance with the identified object and object content; and,
    iv) generating interface code in accordance with object request; and,
  b) generating interface code by:
    i) identifying possible interactions with the content;
    ii) determining instructions for one or more of the possible interactions; and,
    iii) generating the interface code using the instructions; and,
  c) generating interface code by:
    i) determining sequences of interactions representing one or more respective tasks; and,
    ii) generating the interface code in accordance with the sequences.

18. A method according to claim 16, wherein the method includes generating the interface by:
  a) creating a template for at least one of:
    i) presenting object content; and,
    ii) presenting available user inputs; and,
  b) generating interface code in accordance with the template.

19. A method according to claim 16, wherein the object content includes a number of content items, and wherein the method includes:
  a) selecting a content item;
  b) defining an interface item corresponding to the selected content item; and,
  c) generating the interface code in accordance with the interface item.

20. A system for generating interface code usable to facilitate user interaction with content presented by a computer system, the system including a suitably programmed computer system that:
  a) analyzes the content to identify:
    i) at least some object content to be presented to the user, the object content forming part of an object in an object model, the object model being useable to allow the content to be displayed by a browser application; and,
    ii) at least one interaction to be performed;
  b) generates a user interface to be presented to the user, the user interface being indicative of:
    i) at least some of the object content to be presented to the user; and,
    ii) at least one available user input;
  c) generates a browser instruction for causing the browser application to implement the at least one interaction; and,
  d) generates interface code indicative of the user interface and the browser instruction, the interface code being executable by an interface application to cause the interface application to:
    i) obtain any required object content from the browser application;
    ii) present the user interface to the user;
    iii) determine at least one user input in response to presentation of the user interface;
    iv) determine a browser instruction in accordance with the user input; and,
    v) provide the browser instruction to the browser application to cause the browser application to execute the browser instruction and thereby interact with the content.

* * * * *